Nov. 19, 1929.  H. E. BRYANT  1,736,428
PORTABLE WELDING APPARATUS
Original Filed Feb. 10, 1926
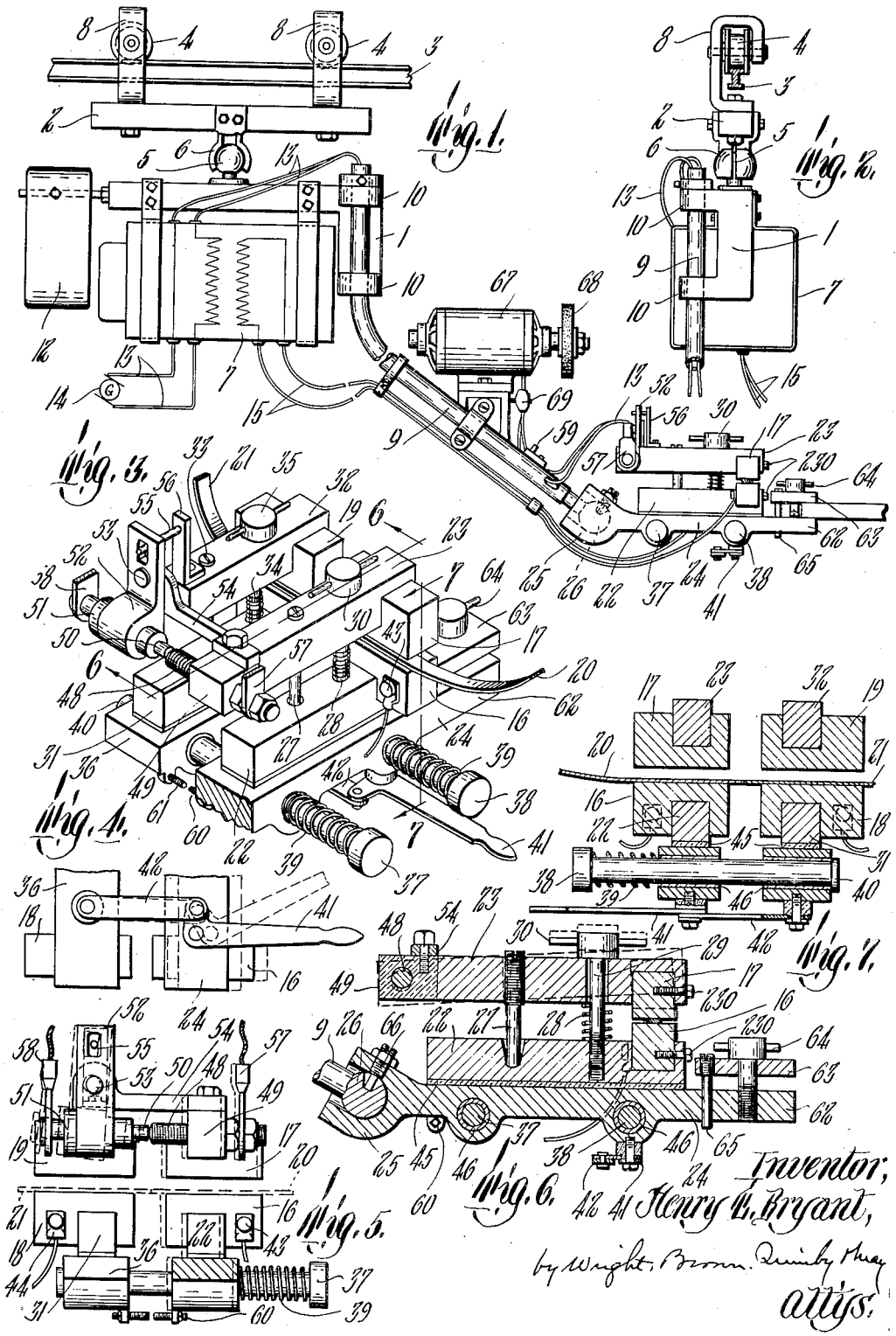

Patented Nov. 19, 1929

1,736,428

UNITED STATES PATENT OFFICE

HENRY E. BRYANT, OF PROVIDENCE, RHODE ISLAND, ASSIGNOR, BY MESNE ASSIGNMENTS, TO ANACONDA WIRE AND CABLE COMPANY, A CORPORATION OF DELAWARE

PORTABLE WELDING APPARATUS

Application filed February 10, 1926, Serial No. 87,269. Renewed May 4, 1929.

The present invention relates to electric welding apparatus and has for its object to provide a portable machine of improved character, both as to the means for mounting it portably and as to the agencies with which it is equipped for grasping the parts to be welded and for controlling the making of the weld. The machine described in this specification as an illustrative embodiment of the invention, has been designed more particularly for use in butt welding the ends of iron strips in connection with machines for coiling such strips into flexible tubing or conduit, and armor for electrical cable. The strip material used in manufacturing such goods is drawn from a supply spool, and when the supply on the spool is about exhausted, a new strip is welded to the end of the used strip.

With this use in mind, one of my objects has been to enable the welding apparatus to be transported bodily up to the various conduit- or armor-forming machines and placed in position to weld together the ends of old and new supply strips while the latter are placed in the machine or in position to be loaded in the machine and to be brought to the place of use, and thence shifted from place to place, without interfering with such machines or occupying floor space.

The use above mentioned is illustrative only, and it should be understood that I do not put any restriction on the uses to which I may apply this invention, within the capabilities of the various possible embodiments of the same.

Other objects of the invention, having to do with provisions for grasping the pieces to be welded and making the weld, and means for interrupting the current when the weld has been completed, are generic so far as the character of the material to be welded and the mode of use of the apparatus are concerned.

The characteristics of the invention can best be stated and explained in connection with a description of a specific embodiment of the invention.

In the drawings:—

Figure 1 is a side elevation illustrating the essential parts of an apparatus embodying this invention and designed for welding strip material in proximity to a machine operating to wind such material helically into a tube.

Fig. 2 is an elevation as seen from the right of Fig. 1 showing the suspension carriage and the part of the apparatus immediately adjacent thereto;

Fig. 3 is a perspective view of the assemblage of jaws or vises and accessory members by which the parts to be welded are gripped and brought together;

Fig. 4 is a fragmentary view of the same mechanism as seen from beneath;

Fig. 5 is an elevation of the same mechanism as seen from the left of Figs. 1 and 3;

Figs. 6 and 7 are cross sections of the same mechanism taken on lines 6—6 and 7—7 respectively of Fig. 3.

The welding apparatus 1 is suspended from a carriage 2 which, in turn, is suspended from an overhead track 3 by wheels 4 held in brackets 8. A ball and socket joint, 5, 6, connects the carriage and welding apparatus together. The latter consists of a frame on which a transformer, and other electrical equipment necessary or usual with apparatus of this character designated diagrammatically at 7) are mounted; and includes also an arm 9 swiveled in bearings 10 on the frame, and extending thence on a downward inclination when in position for use, a welding vise mechanism 11 connected to the end of said arm, and a counterweight 12 supported from the frame at the opposite side of the ball and socket joint from the vise mechanism. This weight is far enough away from the joint and heavy enough to counterbalance, or slightly overbalance the vise mechanism, so that the latter when left free, will be raised clear of objects on the floor of the shop.

Having regard to the circumstances in which the apparatus is intended to be used, the rail or track 4 is supported at a high enough level to enable the welding apparatus to clear machines on the floor, and extends to those parts of the shop where machines using the material to be welded are located. The arm 9 is long enough, and extends at a suitable inclination to the frame 7, to enable the vise mechanism to be brought into the necessary propinquity to operating machines for welding together the ends of old and new supplies of strip materials used by such operating machines, while the swiveled mounting of the arm in its bearings 10, and of the whole apparatus by the ball and socket joint, enables the vise mechanism to be brought into any location within a wide distance beneath and to either side of the track.

My invention does not involve anything novel in the purely electrical equipment of the apparatus, apart from the vise mechanism, and, therefore, such electrical equipment is shown in a conventional way. It is sufficient for the purposes of the present disclosure to say that 13 represents the primary circuit of the transformer, which is supplied with current from any suitable source, represented as the generator 14, and that 15 represents the conductors leading from the secondary circuit to the welding jaws. The primary circuit 13 also includes wires leading to control switches associated with the vise mechanism, as later described.

The vise mechanism comprises two sets of jaws 16—17 and 18—19, respectively, by which the strips 20 and 21, or other articles, to be welded together are gripped. Bars 22 and 23 carry the jaws 16 and 17, respectively, said bars and jaws being mortised into one another and secured by screws 230, or other suitable means, as shown in Figs. 1 and 6. The bar 22 is mounted on a plate 24, which in turn is connected to the arm 9 by a ball and socket joint consisting of a socket member 25 projecting from one end of the plate and a ball 26 on the end of the arm 9 fitting the socket in said member. The bar 23 is supported from the bar 22 by a fulcrum pin 27, threaded into the bar 23 and entering a flaring recess in the bar 22, against the bottom of which it is seated, and a spring 28 confined between the two bars. This spring is positioned by a screw 29 passing freely through a hole in the bar 23 and threaded into the bar 22, this being the vise screw by which the jaws are drawn together to grip the stock. A handle bar 30 is mounted in the head of the screw for turning it.

The jaws 18 and 19 of the other vise are similarly mounted on bars 31 and 32 which are connected and spaced apart in the same way by a fulcrum pin 33, spring 34 and screw 35, essentially like the similar members already described. The bar 31 is secured to a plate 36 and the latter is connected with the plate 24 by rods 37 and 38. These rods pass through the two plates and are free in at least one of them in this case the plate 24, and each carries a spring 39 between a head on its outer end and this plate. Withdrawal of the rods from the other plate is prevented by a head 40 on the opposite end of the rod, or other suitable means. The effort of the springs is to move the plates and the vises carried thereby toward one another. A lever 41 is pivoted to the plate 24 and coupled by a link 42 with the other plate, being operable manually to move the plates apart against the force of the springs.

The electrical conductors 15 from the terminals of the secondary circuit are connected electrically to the jaws 16 and 18, respectively, of the two vises, these connections being indicated at 43 and 44. These jaws are of bronze or other good conducting material, while the other parts of the vises and their supporting plates are of adequately strong structural material, which may be also electrically conductive, such as iron or steel. Short-circuiting of the welding current through the vise mechanism is prevented by insulating the bars 22 and 31 from their supporting plates, and the rods 37 and 38 also from the plates, by means of interposed sheets or plates 45 and sleeves 46 of insulating material, substantially as shown in the drawing.

It will be understoood that preparatory to making the weld, the vises are moved apart and the pieces to be welded are placed in the vises with their adjacent ends abutting on one another. After this has been done and the separating lever 41 released, the springs 39 press these pieces forcibly against one another and move them further together so as to upset and consolidate the weld when they have become softened by heat.

The invention includes also an automatic switch for shutting off the current when the weld has been made. Such switch is operated by the movement of the vises toward one another and comprises separable switch contacts in the primary circuit of the welding transformer. One of the switch contacts is a rod or screw 48 mounted adjustably in a block of insulating material 49 which is secured to the bar 23. The complemental contact is a rod or stem 50 pasing through a bushing 51 of insulating material secured in or to a lever 52. Said lever is swiveled to a pivot 53 carried by a plate 54 which in turn is secured to the bar 23. The lever is also engaged with a pin or finger 55 extending from a bracket 56 secured to the bar 32. Electrical couplings or connectors 57 and 58 are attached to the contact members 48 and 50, respectively, and are connected in one of the electrical circuits, preferably the primary, as here shown.

It will be apparent from the foregoing that when the vises are drawn apart the switch contact 50 is moved ahead into engagement with the contact 48; and conversely when the vises are moved together the contacts are separated to open the switch. A normally open switch 59 is also interposed in the primary circuit and is held closed by the operator in making the weld. The approach of the vises together is limited by an adjustable screw 60 on the plate 24 striking an abutment 61 on the plate 36, said abutment being preferably of insulating material.

One of the plates, as 24 of the vice mechanism, has an extension 62 forming one jaw of a clamp and carrying a complemental clamp jaw 63 and a clamp screw 64 for moving the jaws together. A guide pin 65 is mounted in one of the jaws and slides through the other. The clamp so provided is useful for securing the vise mechanism to some part of the machine in connection with which it is used, so as to hold this mechanism stationary while the welding operation is performed.

The ball and socket joint 25—26 enables the vise mechanism to be turned in any direction so as to be clamped as above described to accessible parts of the machine. The socket member of this joint is as wide at its mouth as the ball, and the latter is retained in the socket by a screw 66 threaded through the side of the socket and having a reduced end which enters a conical recess in the side of the ball, such recess having radial sides and being wide enough to permit turning of the joint through a large enough angle for the purposes indicated.

There is secured to the arm 9 in convenient proximity to the vise mechanism, an electric motor 67 carrying and adapted to drive a grinding wheel 68 for trimming and smoothing down the fin or bulge raised at the welded joint. The circuit conductors for the motor may be coupled to any suitable source of electrical current, and include a control switch 69.

It is to be understood that the parts of the welding apparatus which include the transformer and the connections and control means for the same and for the electric current delivered thereto, here shown diagrammatically, may be constructed in accord with known principles and standard practice in welding apparatus. It may be understood also that the other parts of the apparatus may be variously modified as to construction and arrangement, within the scope of my claim to protection.

What I claim and desire to secure by Letters Patent is:

1. The combination with an elevated track of a carriage suspended from the track, and a welding apparatus suspended from said carriage by a ball and socket joint, said apparatus including an arm and a vise mechanism carried by said arm, extending laterally far from the vertical through said joint and counterbalanced at the opposite side of such vertical.

2. The combination with an elevated track of a carriage suspended from the track, and a welding apparatus suspended from said carriage by a universal joint, said apparatus including an arm extending laterally from the vertical through said joint and a vise mechanism connected to the end of said arm by a universal joint, and a counterbalance for said arm and vise mechanism at the opposite side of said vertical therefrom.

3. A portable electric welding apparatus comprising in combination with an elevated track a carriage adapted to run on said track, a ball and socket suspension joint connected to the carriage, and a welding apparatus, including a swiveled arm and a vise mechanism, mounted on said arm at one side of said ball and socket joint and a counterweight at the other side of said joint.

4. The combination with an elevated track and a carriage adapted to travel on said track, of a welding apparatus in swiveled connection with said carriage; said welding apparatus comprising a frame structure, an arm extending laterally from said frame structure and a vise mechanism mounted on the end of said arm remote from the frame.

5. The combination with an elevated track and a carriage adapted to travel on said track, of a welding apparatus in swiveled connection with said carriage; said welding apparatus comprising a frame structure, an arm extending laterally from said frame structure and a vise mechanism mounted on the end of said arm remote from the frame and swiveled thereto.

6. In a welding apparatus a vise mechanism comprising two pairs of jaws and means for closing the jaws of each pair upon the articles to be welded, a spring engaged with the vises tending to move them toward one another, a frame structure to which said vise mechanism is connected, an elevated track from which said frame structure is suspended, and a clamp associated with said vise mechanism for securing it to a stationary object in position for use.

7. The combination with an elevated track of a carriage supported by said track, and a welding apparatus suspended flexibly from said carriage; said welding apparatus having an extended arm, a vise mechanism flexibly connected to said arm, and a clamp in association with said vise mechanism for securing it to a stationary object.

8. In a welding apparatus a vise mechanism consisting of two pairs of cooperating jaws, means for independently closing the jaws of each pair upon the articles to be welded, supporting means for both pairs of jaws, yieldable constantly acting means tending to move one pair of jaws toward the other and manually operable means for moving them apart against the force of said yieldable means.

9. In a welding apparatus a frame structure, a plate connected to said structure, a vise mounted on said plate, a second plate beside the first named plate, supporting and guiding means connecting the two plates together with provision for movement of one of them toward and away from the other, spring means arranged for causing them to move together, a second vise mounted on said second plate; a lever pivoted to one of said plates and a link coupled to said lever and the other plate, for moving the plates and vises apart from one another.

10. In a welding apparatus, two vises mounted side by side with provision for movement toward and away from each other, means tending to move them toward one another, electric conductors in an electric welding circuit connected with a jaw of each vise in series connection, a controlling switch in the welding circuit closable prior to welding, and means operated by the vises in their movement toward one another to open said switch.

11. In a welding apparatus two vises mounted side by side with provision for movement of one toward and away from the other, means tending to move one toward the other, electric conductors in a welding electric circuit connected with a jaw of each vise in series connection, and a controlling switch for the welding circuit operable by relative approaching movement of the vises to break the circuit; said switch comprising complemental contacts mounted on the respective vises, one of said contacts having a pivotal connection with the vise on which it is mounted and being coupled to the other vise for independent movement relatively thereto.

12. In an electric welding apparatus a vise mechanism comprising two vises movable toward and away from one another and a controlling switch for interrupting the welding circuit when said vises are moved together, said switch comprising complemental contacts one of which is connected in a swiveled manner with one of said vises and is connected with the other vise at a point at one side of its swivel axis, whereby it is given an independent movement in addition to the movement of approach and recession between the vises.

13. In an electric welding apparatus a pair of vises for the articles to be welded together, said vises being mounted with provision for movement of one toward and away from the other, and a control switch for the electric circuit of said welding apparatus comprising complemental contacts, one of which is carried rigidly by one of said vises and the other is engaged in a pivotal manner with both vises.

14. An electric welding apparatus comprising a carriage adapted to be suspended from an overhead track and a welding apparatus comprising a frame connected with said carriage, a rigid arm extending on a downward inclination from said frame and swiveled thereto with capacity for horizontal swinging movement, and stock clamping, relatively movable welding jaws mounted on the lower extremity of said arm.

15. An electric welding apparatus comprising a carriage adapted to be suspended from an overhead track and a welding apparatus comprising a frame connected with said carriage, a rigid arm extending on a downward inclination from said frame and swiveled thereto with capacity for horizontal swinging movement, a universal coupling carried by the lower end of said arm, complementally relatively movable pairs of stock clamping and welding jaws connected to the arm by said universal coupling, and a clamp associated with said jaws for engaging a stationary object and locating the jaws with respect to such object.

16. In an electric welding apparatus, a vise mechanism comprising two supports mounted with provision for movement toward and away from one another, a vise mounted on each of said supports, each vise comprising separable jaws for gripping the material to be welded, one of which is an electrical conductor, and a bar carrying one of said jaws, a fulcrum pin, and a spring spaced apart from said pin located between such bar and the support therefor, and a screw cooperating with said bar and support for bringing the bar and the jaw carried thereby into clamping cooperation with the complemental jaw of the vise.

In testimony whereof I have affixed my signature.

HENRY E. BRYANT.